US010509955B2

(12) United States Patent
Su et al.

(10) Patent No.: US 10,509,955 B2
(45) Date of Patent: Dec. 17, 2019

(54) LIVING BODY DETECTION DEVICE, LIVING BODY DETECTION METHOD, AND RECORDING MEDIUM

(71) Applicant: NEC Corporation, Tokyo (JP)

(72) Inventors: Leiming Su, Tokyo (JP); Mamoru Inoue, Tokyo (JP); Kenta Aino, Tokyo (JP); Hiroaki Morita, Takasaki (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 16/125,441

(22) Filed: Sep. 7, 2018

(65) Prior Publication Data
US 2019/0012533 A1 Jan. 10, 2019

Related U.S. Application Data

(63) Continuation of application No. 15/557,685, filed as application No. PCT/JP2015/057586 on Mar. 13, 2015.

(51) Int. Cl.
G06K 9/00 (2006.01)
G06T 1/00 (2006.01)
(Continued)

(52) U.S. Cl.
CPC ........ G06K 9/00362 (2013.01); G06T 1/0014 (2013.01); G06T 7/00 (2013.01);
(Continued)

(58) Field of Classification Search
CPC ............ G06K 9/00892; G06K 9/00906; G06T 2207/10048; G06T 7/40
(Continued)

(56) References Cited

U.S. PATENT DOCUMENTS 5,940,139 A 8/1999 Smoot
6,529,617 B1 3/2003 Prokoski
(Continued)

FOREIGN PATENT DOCUMENTS

EP 3118811 A1 1/2017
JP 01-299488 12/1989
(Continued)

OTHER PUBLICATIONS

Non-final Office Action U.S. Appl. No. 15/557,685, dated Dec. 11, 2018, in the United States Patent and Trademark Office.
(Continued)

Primary Examiner — Yosef Kassa
(74) Attorney, Agent, or Firm — Finnegan, Henderson, Farabow, Garrett & Dunner, L.L.P.

(57) ABSTRACT

A living body detection device (1) includes: an image acquisition unit (171), a determination unit (173) and a detection unit (174). The image acquisition unit (171) acquires a first image in which a subject irradiated by light in a first wavelength range is imaged, and a second image in which the subject irradiated by light in a second wavelength range is imaged, the second wavelength range being different from the first wavelength range. The determination unit (173) determines whether a relation expressed by luminance of the subject imaged in the first image and luminance of the subject imaged in the second image is a relation exhibited by a living body. The detection unit (174) detects that the subject is a living body in a case where the determination unit (173) has determined that it is the relation exhibited by the living body.

12 Claims, 11 Drawing Sheets

(51) Int. Cl.
*G06T 7/00* (2017.01)
*G06T 7/73* (2017.01)

(52) U.S. Cl.
CPC .............. *G06T 7/0004* (2013.01); *G06T 7/73* (2017.01); *G06T 2207/10048* (2013.01); *G06T 2207/10152* (2013.01); *G06T 2207/20004* (2013.01); *G06T 2207/30201* (2013.01)

(58) Field of Classification Search
USPC ....... 382/115, 118, 128, 209, 279; 340/5.81, 340/5.82, 5.83
See application file for complete search history.

(56) References Cited

U.S. PATENT DOCUMENTS

| | | | |
|---|---|---|---|
| 6,642,955 B1 | 11/2003 | Midgley | |
| 6,854,879 B2 | 2/2005 | Pavlidis | |
| 6,879,709 B2 | 4/2005 | Tian | |
| 7,076,088 B2 * | 7/2006 | Pavlidis | G06K 9/00228 348/164 |
| 7,136,513 B2 * | 11/2006 | Waehner | G06K 9/00221 382/118 |
| 7,138,905 B2 * | 11/2006 | Pavlidis | A61B 5/01 340/5.81 |
| 7,166,827 B2 | 1/2007 | Sugihara | |
| 7,491,889 B2 * | 2/2009 | Dinkelmeyer | H02G 1/08 174/120 R |
| 7,545,961 B2 * | 6/2009 | Ahern | G06F 21/32 382/115 |
| 7,599,847 B2 | 10/2009 | Block | |
| 7,605,709 B2 * | 10/2009 | Tolliver | G07C 9/00158 340/5.7 |
| 7,657,062 B2 | 2/2010 | Pilu | |
| 7,689,055 B2 | 3/2010 | Zhang et al. | |
| 7,750,366 B2 | 7/2010 | Okino | |
| 7,804,982 B2 | 9/2010 | Howard et al. | |
| 7,986,816 B1 | 7/2011 | Hoanca et al. | |
| 8,064,688 B2 | 11/2011 | Schneiderman | |
| 8,411,909 B1 | 4/2013 | Zhao | |
| 8,465,171 B2 | 6/2013 | Kishimoto | |
| 8,600,468 B2 | 12/2013 | Yamamoto | |
| 8,649,604 B2 | 2/2014 | Steinberg et al. | |
| 8,965,068 B2 * | 2/2015 | Yoon | A61B 5/1176 382/118 |
| 9,081,947 B2 | 7/2015 | Dewan et al. | |
| 9,245,173 B2 | 1/2016 | Lee et al. | |

FOREIGN PATENT DOCUMENTS

| | | |
|---|---|---|
| JP | 06-111083 | 4/1994 |
| JP | A-2003-536303 | 12/2003 |
| JP | 2004-185262 | 7/2004 |
| JP | 2006-47067 | 2/2006 |
| JP | 2006-98340 A | 4/2006 |
| JP | 2009-9403 | 1/2009 |
| JP | 2009-076012 | 4/2009 |
| JP | 2009-187130 | 8/2009 |
| JP | 2011-221672 | 11/2011 |
| JP | 2012-69133 | 4/2012 |
| JP | A-2012-128792 | 7/2012 |
| JP | 2013-061875 | 4/2013 |
| JP | 2014-94301 A | 5/2014 |
| JP | 2014-174794 | 9/2014 |
| WO | WO 2014/004179 A1 | 1/2014 |

OTHER PUBLICATIONS

International Search Report dated Jun. 2, 2015, in corresponding PCT International Application.

Notification of Reasons for Refusal issued by Japanese Patent Office in counterpart Japanese Patent Application No. 2017-505887, dated Dec. 22, 2017.

Notification of Reasons for Refusal dated May 8, 2018, and an English-language machine translation, issued from the Japanese Patent Office in counterpart Japanese Patent Application No. 2017-505887.

Office Action of the counterpart European Patent Application No. EP 15 88 5370 dated Feb. 1, 2019.

Kim et al.; "Masked fake face detection using radiance measurements", Journal of the Optical Society of America A, vol. 26, No. 4, Apr. 1, 2009, pp. 760-766 (2009).

Pavlidis et al.; "The Imaging Issue in an Automatic Face/Disguise Detection System", Proceedings IEEE Workshop on Computer Vision Beyond the Visiblespectrum: Methods and Applications, XX, XX, Feb. 16, 2000, pp. 15-24, (2000).

Cooksey et al.; "A collection and statistical analysis of skin reflectance signatures for inherent variability over the 250 nm to 2500 nm spectral range", Visual Communications and Image Processing; Jan. 20, 2004-Jan. 20, 2004; San Jose, vol. 9082, Jun. 4, 2014, pp. 908206-1-908206-11 (2014).

Li et al.; "Illumination Invariant Face Recognition Using Near-Infrared Images", IEEE Transactions on Pattern Analysis and Machine Intelligence, vol. 29, No. 4, Apr. 1, 2007 (Apr. 1, 2007), pp. 627-639 (2007).

Office Action dated Apr. 17, 2019, issued by The U.S. Patent and Trademark Office in co-pending U.S. Appl. No. 15/557,685.

Yasuhiro Suzuki et al., "Detection Method of Skin Region by Near-IR Spectrum Multi-Band" Journal of Institute of Electrical Engineers of Japan, Apr. 1, 2007, vol. 127, No. 4, pp. 583-590.

Notification of Reasons for Refusal of the counterpart Japanese Patent Application No. 2018-130300 dated Jul. 2, 2019.

Notice of Allowance dated Sep. 3, 2019, issued in co-pending U.S. Appl. No. 16/125,483.

Notice of Allowance dated Sep. 18, 2019, issued in co-pending U.S. Appl. No. 15/557,685.

Notice of Allowance dated Sep. 20, 2019, issued in co-pending U.S. Appl. No. 16/125,514.

* cited by examiner

LIVING BODY DETECTION DEVICE, LIVING BODY DETECTION METHOD, AND RECORDING MEDIUM

CROSS-REFERENCE TO RELATED PATENT APPLICATIONS

This application is a continuation of U.S. patent application Ser. No. 15/557,685, filed Sep. 12, 2017, which is a National Stage Entry of International Application No. PCT/JP2015/057586, filed Mar. 13, 2015. The entire contents of the above-referenced applications are expressly incorporated herein by reference.

TECHNICAL FIELD

The present invention relates to a living body detection device, a living body detection method, and a recording medium.

BACKGROUND ART

Face authentication techniques are known that analyze facial images captured by a camera and authenticate the individual (hereinbelow simply referred to as face authentication). In this kind of face authentication, there is the problem of unauthorized authentication in which someone else impersonates the individual by using a photograph of the individual. Moreover, various techniques are known for preventing unauthorized authentication by this kind of impersonation.

For example, Patent Document 1 discloses a technique for preventing unauthorized authentication by impersonation using a photograph or the like by performing a three-dimensional detection using multiple facial images of different orientations.

PRIOR ART DOCUMENTS

Patent Documents

[Patent Document 11] Japanese Unexamined Patent Application, First Publication No. 2012-069133

SUMMARY OF THE INVENTION

Problem to be Solved by the Invention

However, when someone disguises himself as another person by wearing a sophisticated disguising mask, since the person's face is three-dimensional, it is not possible to prevent unauthorized authentication by the above three-dimensional detection technique.

Moreover, with recent sophisticated disguising masks, even with the human eye it is sometimes difficult to distinguish between a real face and a disguising mask being worn. For example, during the immigration inspection of an airport, there are cases of a person who wears a disguising mask using a forged passport with a photograph of the disguising mask to clear the visual matching by an immigration officer.

In addition to the above case of a disguising mask, disguise is similarly possible by using something for disguise that is difficult to visually distinguish from skin (for example, a sheet-like object resembling skin in appearance). In view of such circumstances, a technique for detecting with high accuracy whether the surface of a person's face is a living body such as skin is sought.

The present invention was achieved in view of the above situation and has as an objective to provide a living body detection device, a living body detection method, and a recording medium that detect with high accuracy whether or not something is a living body.

Means for Solving the Problem

In order to achieve the above objective, a living body detection device according to a first exemplary aspect of the present invention includes:

an image acquisition unit that acquires a first image in which a subject irradiated by light in a first wavelength range is imaged, and a second image in which the subject irradiated by light in a second wavelength range is imaged, the second wavelength range being different from the first wavelength range;

a determination unit that determines whether a relation expressed by luminance of the subject imaged in the first image and luminance of the subject imaged in the second image is a relation exhibited by a living body; and a detection unit that detects that the subject is a living body in a case where the determination unit has determined that it is the relation exhibited by the living body.

In order to achieve the above objective, a living body detection method according to a second exemplary aspect of the present invention includes:

an image acquisition step of acquiring a first image in which a subject irradiated by light in a first wavelength range is imaged, and a second image in which the subject irradiated by light in a second wavelength range is imaged, the second wavelength range being different from the first wavelength range;

a determination step of determining whether a relation expressed by luminance of the subject imaged in the first image and luminance of the subject imaged in the second image is a relation exhibited by a living body; and a detection step of detecting that the subject is a living body in a case where the determination unit has determined that it is the relation exhibited by the living body.

In order to achieve the above objective, a recording medium according to a third exemplary aspect of the present invention stores a program that causes a computer to function as:

an image acquisition unit that acquires a first image in which a subject irradiated by light in a first wavelength range is imaged, and a second image in which the subject irradiated by light in a second wavelength range is imaged, the second wavelength range being different from the first wavelength range;

a determination unit that determines whether a relation expressed by luminance of the subject imaged in the first image and luminance of the subject imaged in the second image is a relation exhibited by a living body; and a detection unit that detects that the subject is a living body in a case where the determination unit has determined that it is the relation exhibited by the living body.

Effect of the Invention

According to the present invention, it is possible to detect with high accuracy whether or not something is a living body such as skin.

EXEMPLARY EMBODIMENTS FOR CARRYING OUT THE INVENTION

Hereinbelow, exemplary embodiments of the present disclosure will be described in detail with reference to the drawings.

Exemplary Embodiment 1

A living body detection device 1 according to Exemplary embodiment 1 of the present disclosure is installed, for example, near an entry gate in an airport immigration inspection area. The living body detection device 1 has the function of determining whether the surface of the face of a person who intends to pass through the entry gate is skin (a living body) or whether the surface of the face is covered by wearing a disguising mask or the like, and giving notice if the surface of the face is not skin.

Here, a disguising mask to be distinguished in particular from skin is for example a sophisticated mask like those used in special effects makeup for a young actor to play a role of an old man in movies and is a mask that is manufactured using a false living body (for example, silicone resin) that is difficult to discriminate from a living body (for example, human skin) by the human eye. Therefore, it is difficult for a human to judge by sight whether the surface of the face is skin or whether such a disguising mask is being worn.

Figure 1:
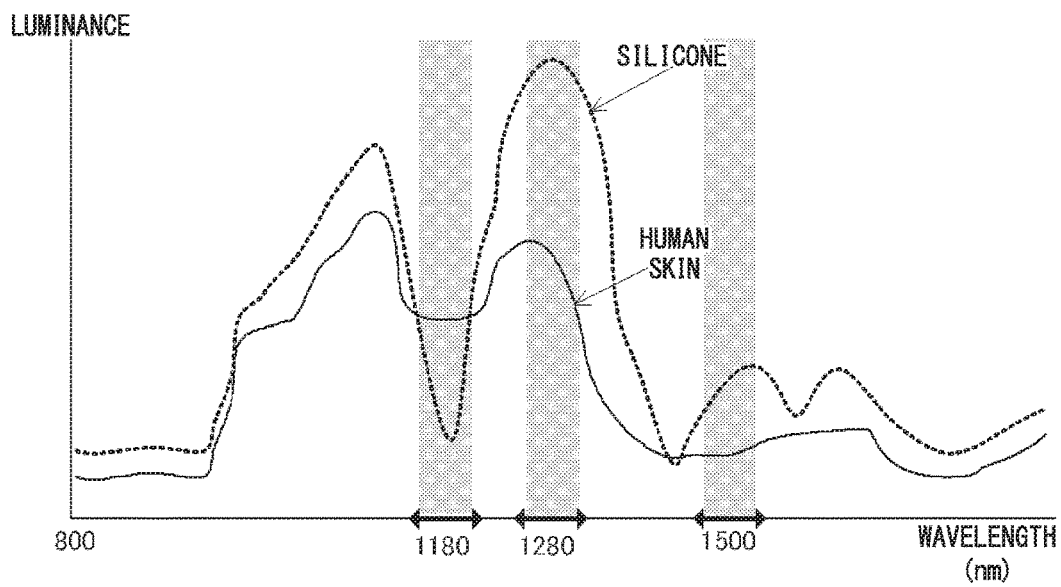
FIG. 1 is a graph that shows the spectra of luminances of reflected light when light is emitted at human skin and silicone resin.

First, the principle of living body detection by the living body detection device 1 will be described. FIG. 1 is a graph that shows the spectra of luminances of reflected light when light is emitted at objects. In this figure, the solid line presents the spectrum of reflected light of light emitted at human skin. The dotted line presents the spectrum of reflected light of light emitted at silicone resin. Luminance indicates the intensity of the reflected light that is measured (that is, indicates the degree of brightness).

In this figure, the luminance of reflected light when light in a wavelength range around 1280 nm is emitted at skin is greater by a predetermined ratio than the luminance of reflected light when light in a wavelength range around 1180 nm and around 1500 nm is emitted at skin. Also, the luminance of reflected light when light in a wavelength range around 1180 nm is emitted at skin is greater by a predetermined ratio than the luminance of reflected light when light in a wavelength range around 1500 nm is emitted at skin. The living body detection device 1, using such luminance spectra peculiar to skin, detects whether the surface of a face is skin by comparing the luminances of the spectra of reflected light in the wavelength ranges around 1180 nm, around 1280 nm and around 1500 nm.

Moreover, the present invention utilizes the differences in the spectra of luminances of reflected light between skin and silicone resin to detect whether or not the surface of a face is skin so as to be able to more accurately detect that the surface of a face is skin as opposed to silicone resin, which is difficult to distinguish from skin by the human eye. The luminance of reflected light when light in a wavelength range of around 1180 nm is emitted at silicone resin is less than the luminance of reflected light when light in a wavelength range of around 1500 nm is emitted at silicone resin. This is because the reflected light weakens due to the silicone resin absorbing well light in the wavelength range of around 1180 nm. For this reason, the relation of the luminances of light reflected by silicone resin around 1180 nm and around 1500 nm differs from the relation exhibited by skin. Accordingly, the living body detection device 1, utilizing the differences in the relation of the luminances of light reflected by skin and silicone resin around 1180 nm and around 1500 nm, detects whether the surface of a face is skin or whether the surface is covered with a silicone resin-made mask.

Figure 2:
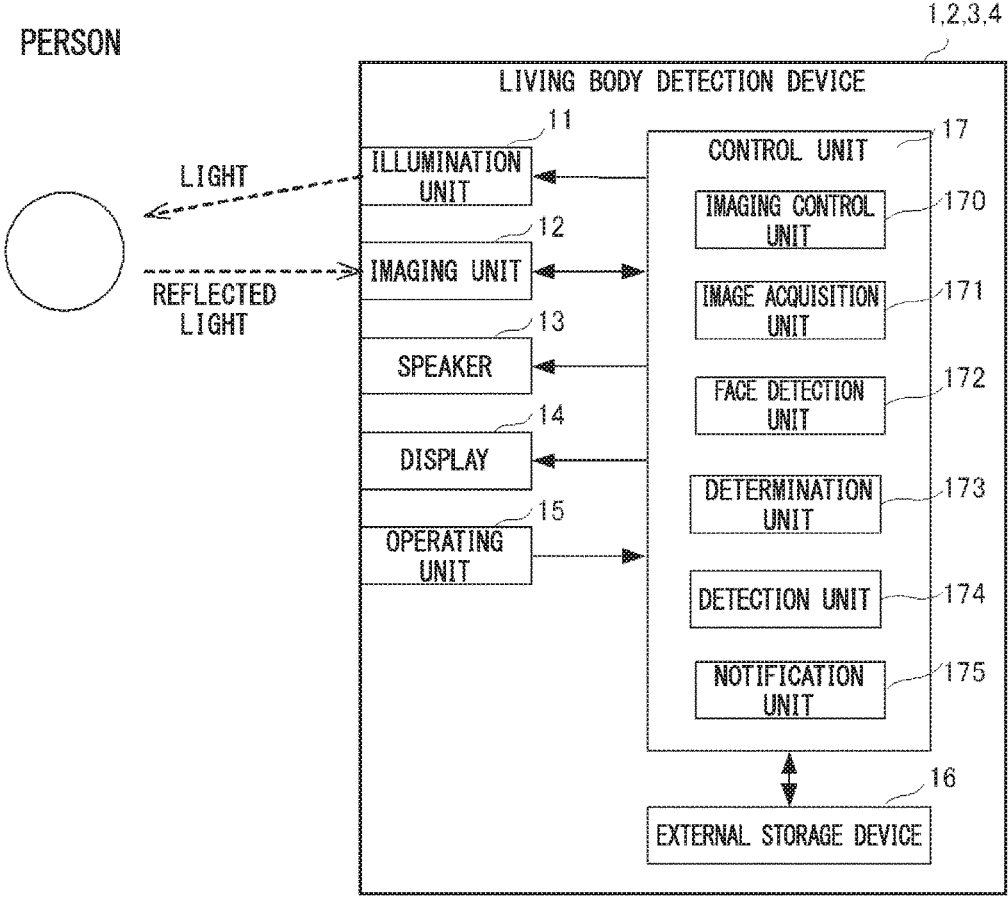
FIG. 2 is a block diagram that shows the constitution of the living body detection device in respective exemplary embodiments.

Subsequently, the configuration of the living body detection device 1 will be described. The living body detection device 1, as shown in FIG. 2, includes an illumination unit 11, an imaging unit 12, a speaker 13, a display 14, an operating unit 15, an external storage device 16, and a control unit 17.

Figure 3A:
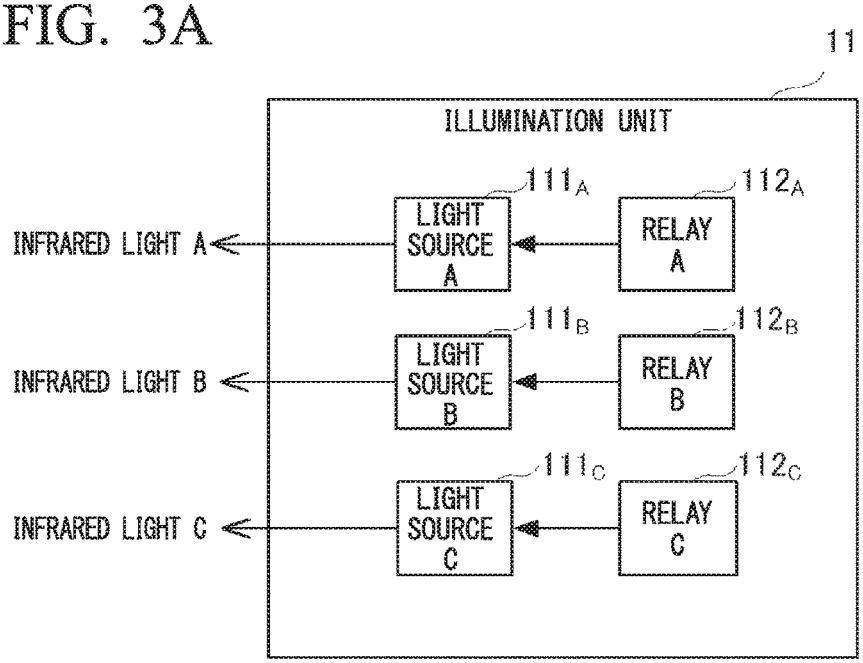
FIG. 3A is a diagram that shows the structure of the illumination unit in the respective exemplary embodiments.

The illumination unit 11, as shown in FIG. 3A, includes light sources 111 of various wavelength ranges (111A to 111C) and relays 112 for each light source 111A (112A to 112C), is turned on/off based on instructions from the control unit 17, and emits light at a person who is a subject. The light sources 111 are constituted by infrared LEDs (light emitting diodes) of various wavelength ranges. The light source 111A emits infrared light around 1180 nm, the light source 111B emits infrared light around 1280 nm, and the light source 111C emits infrared light around 1500 nm. The spectra of light emitted by the light sources 111 (111A to 111C) respectively have peaks of 1180 nm, 1280 nm, and 1500 nm, and have an approximately normal distribution with a half-value width of around 90 nm. The light sources 111, instead of infrared LEDs, a halogen light source and a filter that allows infrared light of each wavelength range to pass may be used to emit infrared light of each wavelength range. The relays 112 control the on/off of the power supply to the light sources 111 based on instructions from the control unit 17.

The imaging unit 12 is a camera that captures images in the wavelength rage of the infrared light region (1000 nm to 1700 nm), and captures images of a subject such as a person irradiated by the illumination unit 11. The imaging unit 12 captures infrared image A at the timing at which the illumination unit 11 emits infrared light around 1180 nm at the subject, captures infrared image B at the timing at which the illumination unit 11 emits infrared light around 1280 nm at the subject, and captures infrared image C at the timing at which the illumination unit 11 emits infrared light around 1500 nm at the subject.

Figure 3B:
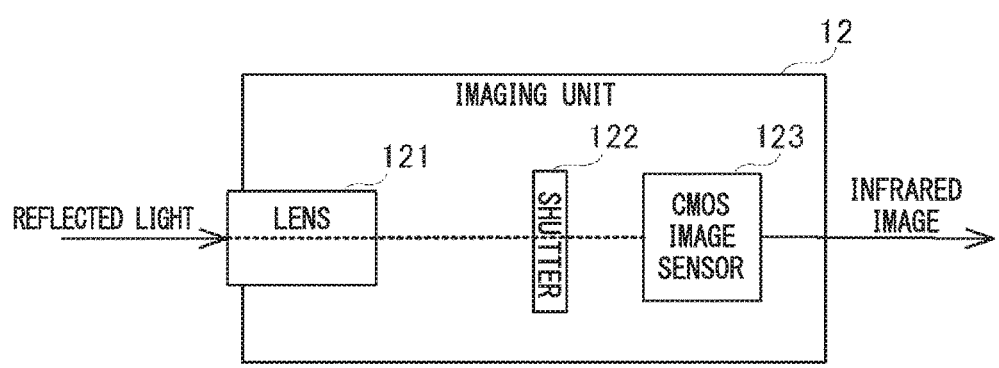
FIG. 3B is a diagram that shows the structure of the imaging unit in the respective exemplary embodiments.

Here, the structure of the imaging unit 12 will be described. The imaging unit 12, as shown in FIG. 3B, includes a lens 121, a shutter 122, and a CMOS (complementary metal-oxide semiconductor device) image sensor 123.

The lens 121 collects the incident light. The shutter 122 transmits light made incident by the lens 121 only during the exposure time, and shuts out the light during other times. The CMOS image sensor 123 converts the light made incident from the lens 121 to an electrical signal to create images in the corresponding wavelength ranges. Specifically, the CMOS image sensor 123 creates the infrared images A to C. Here, an image sensor such as a CCD (charge-coupled device) image sensor may be used in place of the CMOS image sensor 123.

Returning to FIG. 2, the speaker 13 outputs sound on the basis of control of the control unit 17. The display 14 displays various kinds of information on the basis of control of the control unit 17. For example, when it is detected that the surface of a person's face is not skin, the control unit 17 controls the speaker 13 to output a warning sound for giving notice accordingly and the display 14 to display a warning message.

The operating unit 15 includes various buttons, and when the user conducts an operation, outputs to the control unit 17 a signal corresponding to the operation.

The external storage device 16 is, for example, a hard disk drive or the like, and serves as a temporary storage location for images captured by the imaging unit 12 and stores various data necessary for the living body detection process described later.

The control unit 17 is configured by a CPU (central processing unit), a ROM (read only memory), a RAM (random access memory), and the like, and controls the entire living body detection device 1. The control process of the control unit 17 is performed by, specifically, the CPU executing control programs stored in the ROM while using the RAM as the work area to temporarily store various data. The control unit 17 functionally includes an imaging control unit 170, an image acquisition unit 171, a face detection unit 172, a determination unit 173, a detection unit 174 and a notification unit 175.

The imaging control unit 170 controls turning-on/turning-off of the illumination unit 11 and imaging operation of the imaging unit 12 so as to acquire images of a subject in each of the wavelength ranges (infrared images A to C).

The face detection unit 172 analyzes the image captured by the imaging unit 12 to detect the face region of the person. Then, the face detection unit 172 detects in the face region a forehead region, a right cheek region, and a left cheek region, which are situated near face characteristic quantities (eyes, nose, mouth, and the like) and where the skin is exposed in a relatively large area.

The imaging unit 12 captures the infrared images A to C of a person at different timings from the same point. For this reason, when the imaging unit 12 has photographed a still subject (for example, a person's face), there is no displacement in the pixel positions of each infrared image A to C. However, when the imaging unit 12 has photographed a moving subject (for example, a person's face), displacement of the pixel positions occurs between each region detected by the face detection unit 172 from the infrared image A and each region of the other images (infrared image B and C) photographed at different timings. In this case, it is necessary to correct the image displacement of the infrared images B and C. The method of correcting the image displacement of the infrared images B and C is not particularly limited provided it is a method capable of suitably correcting image displacement due to time lag. For example, the direction and length of displacement of the face characteristic regions of the face region captured in infrared images B and C and the face characteristic regions of the face region captured in infrared image A are respectively measured, and the face region captured in infrared image B and C is corrected by shifting the displaced length in the direction opposite to the direction of displacement.

Note that a publicly known detection technique may be adopted for detection of each region by the face detection unit 172.

For example, the face detection unit 172 applies the Sobel filter to the infrared image A to detect outlines and extracts a face outline by face outline pattern matching. Then, the face detection unit 172 detects eyebrow outlines from above and an outline under the mouth from below within the extracted face outline and detects as a face region a region surrounded by the right and left ends of the face and the positions above the eyebrows and under the mouth. Then, the face detection unit 172 detects the black points corresponding to the eyeballs in the detected face region as the eye positions and specifies a forehead region, a right cheek region, and a left cheek region from the face region and eye positions based on general face statistical data. Here, the face detection unit 172 may detect face characteristic quantities such as the eyes, nose, and mouth by a publicly known technique, and when those characteristic quantities are detected, specify their neighboring regions as a forehead region, a right cheek region, and a left cheek region.

Figure 4A:
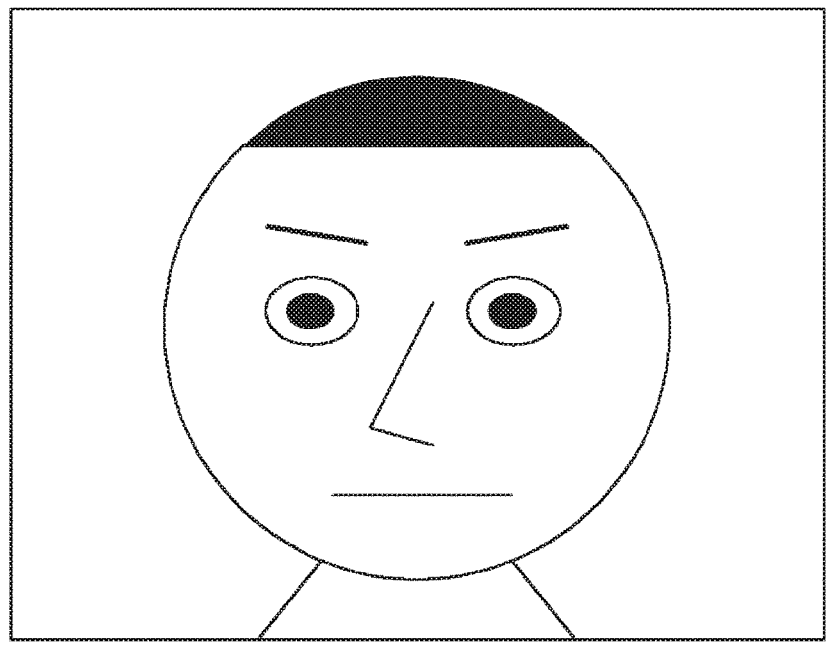
FIG. 4A is a diagram that shows an example of an infrared image.
Figure 4B:
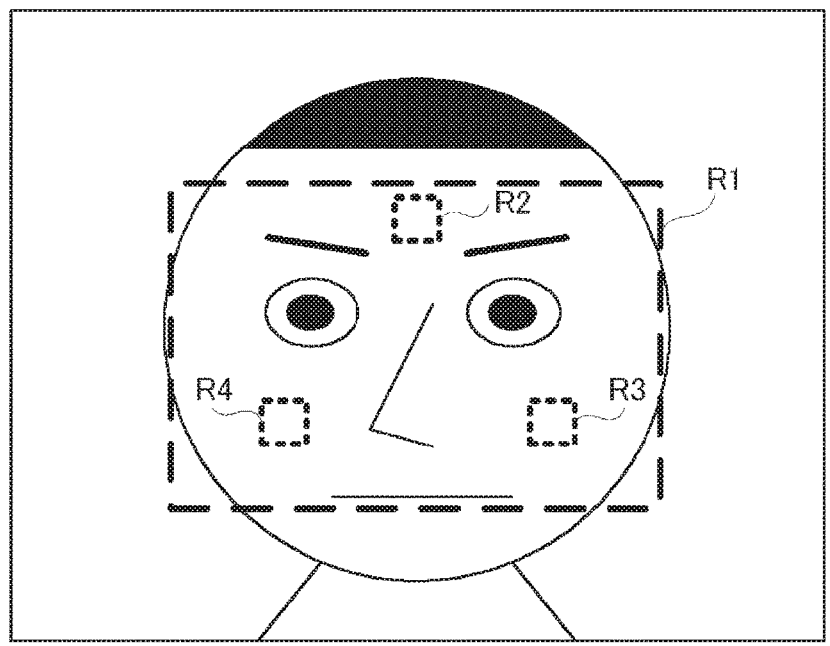
FIG. 4B is a diagram that shows each region of the infrared image shown in FIG. 4A.

Here, the above-described processing by the face detection unit 172 will be described using a specific example. For example, it is assumed that the infrared image A as shown in FIG. 4A is given as the processing target of the face detection unit 172. In such a case, the face detection unit 172 detects a face region R1 as shown in FIG. 4B. Moreover, the face detection unit 172 detects a forehead region R2, a right cheek region R3, and a left cheek region R4 from the face region R1.

Returning to FIG. 2, the determination unit 173 judges whether the luminances of the regions (the forehead region, right cheek region, and left cheek region) specified by the face detection unit 172 between the infrared images A to C satisfy the relations exhibited by skin for each wavelength region represented by the shading in FIG. 1.

The detection unit 174 detects whether or not the surface of the person's face is skin from the determination result of the determination unit 173. The notification unit 175, when the detection unit 174 has determined that the surface of the face is not skin, controls the speaker 13 and the display 14 to give notice accordingly.

Subsequently, the living body detection process executed by the living body detection device 1 will be described. An officer at an immigration inspection station guides a person entering the country into the angle of view of the imaging unit 12 of the living body detection device 1 installed near an entry gate. In doing so, the officer conducts an operation to start the processing via the operating unit 15 of the living body detection device 1. In response to the operation, the control unit 17 of the living body detection device 1 executes the living body detection process shown in the flowchart of FIG. 5.

The living body detection device 1 may include a motion sensor, and when the motion sensor detects a person entering the country, may execute the living body detection process. Alternatively, with the imaging unit 12 set in live view mode, the control unit 17, upon judging that a person is in view, may automatically execute the living body detection process.

Moreover, there is the risk that a person wearing a disguising mask will exercise caution upon seeing the lens of the imaging unit 12 or the like. Therefore, for example, a magic mirror may be placed in front of the imaging unit 12 so that the living body detection process starts with an image captured unnoticeably.

Figure 5:
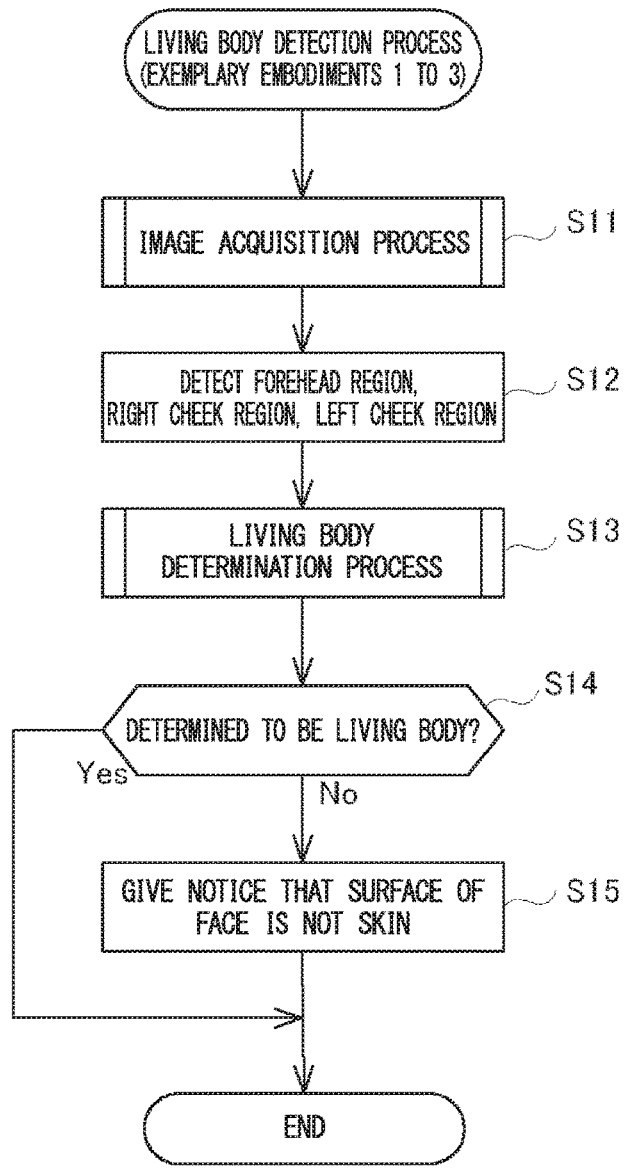
FIG. 5 is a flowchart that shows an example of the flow of the living body detection process.

In the living body detection process of FIG. 5, first, the imaging control unit 170 turns on the light sources 111 (111A to 111C) of the illumination unit 11 and controls the imaging unit 12. The image acquisition unit 171 acquires images of the person in the wavelength ranges (infrared images A to C) (Step S11).

Here, the image acquisition process will be described in detail referring to the flowchart of FIG. 6.

First, the imaging control unit 170 selects one of the light sources 111A to 111C unselected in the ongoing image acquisition process (Step S111). Hereinbelow, the light source 111 selected in Step S111 is also referred to as selected light source 111.

Subsequently, the imaging control unit 170 gives an instruction so as to supply power to the relay 112 corresponding to the selected light source 111 to turn on the selected light source 111 (Step S112). Thereby, the light of the wavelength range of the selected light source 111 is emitted at the subject.

Subsequently, the image acquisition unit 171 captures an infrared image of the subject irradiated by the light from the selected light source 111 (Step S113). In greater detail, the shutter 122 is opened for the exposure time, and the light made incident from the lens 121 is allowed to pass to the CMOS image sensor 123. The CMOS image sensor 123 converts the incident light to an electrical signal to create an image in the corresponding wavelength range. By this image capture process, an infrared image of the subject irradiated by the light from the selected light source 111 is obtained. When the capture of the infrared image has ended, the imaging control unit 170 gives an instruction to stop the supply of power to the relay 112 corresponding to the selected light source 111 and turns off the selected light source 111 (Step S114).

Subsequently, the imaging control unit 170 judges whether or not all of the light sources 111A to 111C have been selected in the image acquisition process (Step S115).

When all of the light sources 111A to 111C have not been selected (Step S115; No), the process returns to Step S111, and the imaging control unit 170 selects a light source 111A to 111C that is yet to be selected and repeats the series of processes for capturing an image of the subject irradiated by the light from the selected light source 111.

On the other hand, when all of the light sources 111A to 111C have been selected (Step S115; Yes), the imaging control unit 170 ends Step S11.

As a result of the imaging control unit 170 performing Step S11, the infrared image A of the subject irradiated by light in the wavelength range around 1180 nm, the infrared image B of the subject irradiated by light in the wavelength range around 1280 nm, and the infrared image C of the subject irradiated by light in the wavelength range around 1500 nm are obtained.

Returning to FIG. 5, subsequently the face detection unit 172 detects a face region from the acquired infrared images A to C and detects a forehead region, a right cheek region, and a left cheek region from the face region (Step S12). Also, since the infrared images A to C were captured at different timings, the subject (person) may appear to have shifted between the infrared images A and C. When the subject appears to have shifted between infrared images A and B, the displacement of the subject is corrected by a method that can suitably correct image displacement due to time lag.

Subsequently, the determination unit 173 compares the luminances of the regions (forehead region, right cheek region, and left cheek region) in the infrared images A to C acquired in Step S11 so as to execute the living body determination process that determines whether or not the surface of the person's face is skin (Step S13).

Figure 7:
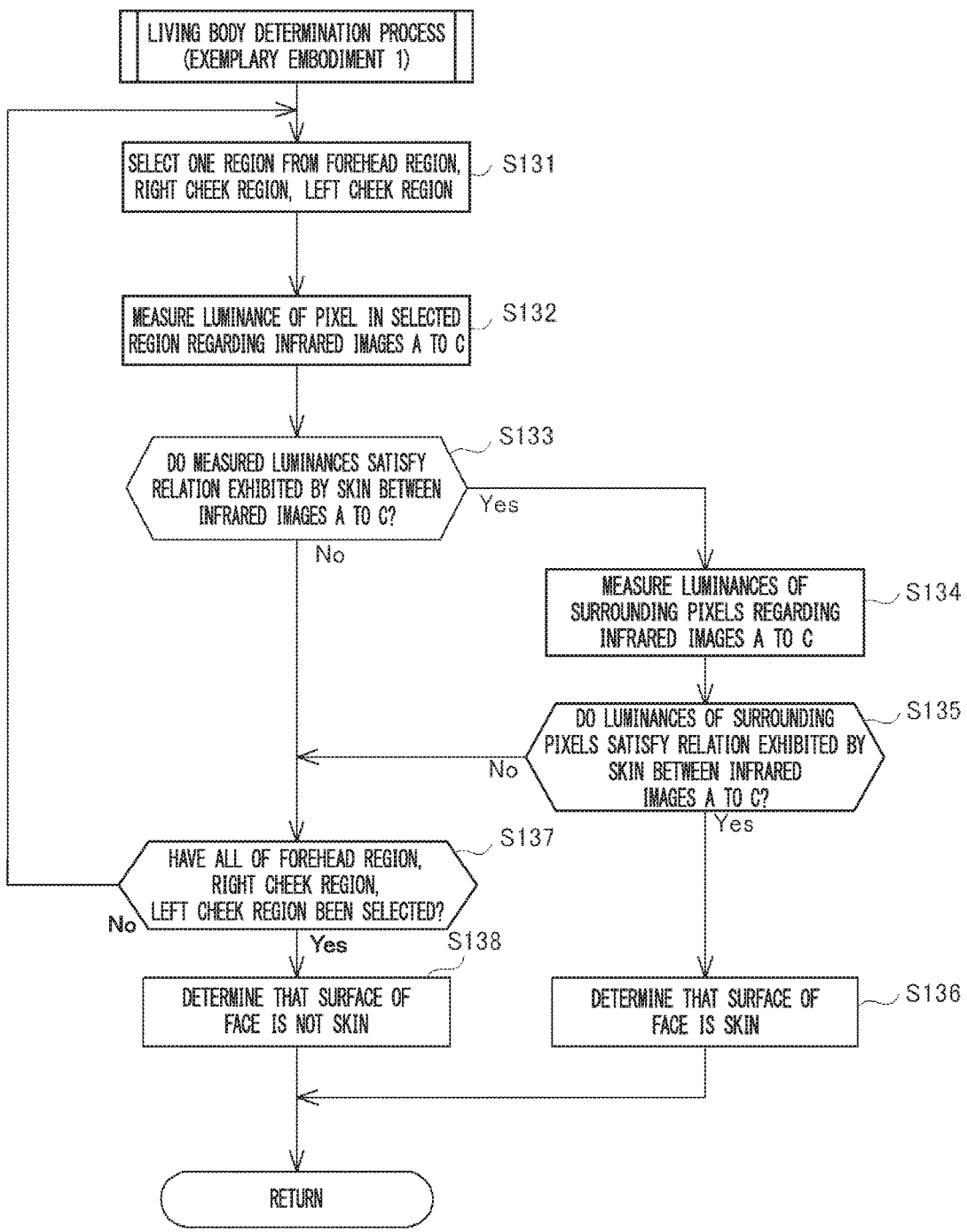
FIG. 7 is a flowchart that shows an example of the flow of the living body determination process of Exemplary embodiment 1.

Here, details of the living body determination process will be described with reference to the flowchart of FIG. 7.

First, the determination unit 173 selects one of the regions unselected in the ongoing living body determination process from among the detected forehead region, right cheek region, and left cheek region (Step S131). The region selected in Step S131 is also referred to as the selected region hereafter.

Subsequently, the determination unit 173 selects one pixel from the selected region (for example, the pixel at the center of the selected region) and measures the luminance of that pixel in each of the infrared images A to C (Step S132).

Subsequently, the determination unit 173 judges whether the measured luminances satisfy the relation exhibited by skin between the infrared images A to C (Step S133). Specifically, the determination unit 173 judges whether the luminance measured from the infrared image C is lower than the luminances measured from the infrared image A and infrared image B by a predetermined ratio. As a result, it is possible to distinguish between human skin and silicone resin, whose luminance around 1180 nm is lower than the luminance around 1500 nm as shown in FIG. 1.

Here, more specifically, the determination unit 173 has only to judge whether the following relational expressions (1) to (3) are all satisfied in Step S133. In the relational expressions (1) to (3), IA is the luminance measured in the infrared image A, IB is the luminance measured in the infrared image B. and IC is the luminance measured in the infrared image C. Moreover, T1 to T3 are coefficients and preset to numerical values optimum for the living body detection based on image capturing conditions.

$$IA > IC \times T1 \tag{1}$$

$$IB > IC \times T2 \tag{2}$$

$$IB > IA \times T3 \tag{3}$$

If the above relational expressions (1) and (2) are satisfied, then the luminance measured in the infrared image C is lower than the luminances measured in the infrared image A and infrared image B by a predetermined ratio. Moreover, if the above relational expression (3) is satisfied, then the luminance measured in the infrared image A is lower than the luminance measured in the infrared image B by a predetermined ratio.

When it is judged that the measured luminances satisfy the relation exhibited by skin (Step S133; Yes), the determination unit 173 measures, in each of the infrared images A to C, the luminance of each of the eight pixels surrounding the pixel measured in Step S132 (Step S134).

Subsequently, the determination unit 173 judges whether the measured luminances of all the surrounding pixels also satisfy the relation exhibited by skin between the infrared images A to C (Step S135).

If the luminances of the surrounding pixels are also judged to satisfy the relation exhibited by skin (Step S135; Yes), the determination unit 173 determines that the surface of the person's face is skin (Step S136) and the living body determination process ends. It should be noted that, in the above-described living body determination process, it is determined that the surface of a face is skin when one pixel and all eight pixels surrounding that pixel in any one of the selected regions (forehead, right cheek, and left cheek) all satisfy the relation exhibited by skin. This is because a disguising mask is generally worn to cover the entire face, and so if it is observed that the surface of the face is skin in any one of the selected regions, it is possible to determine that a disguising mask is being worn without performing the living body determination process on the other selected regions.

On the other hand, if it is judged that the luminance of the one pixel in the selected region does not satisfy the relation exhibited by skin (Step S133; No) or if it is judged that the luminances of the surrounding pixels do not satisfy the relation exhibited by skin (Step S135; No), the determination unit 173 judges whether all of the forehead region, right cheek region, and left cheek region have been selected in the living body determination process (Step S137).

If not all of the forehead region, right cheek region, and left cheek region have been selected (Step S137; No), the processing returns to Step S131 and the determination unit 173 selects an unselected region and repeats the series of processes to judge whether the luminances of pixels in that region satisfy the relation exhibited by skin so as to determine whether the surface of the face is skin.

On the other hand, if all of the forehead region, right cheek region, and left cheek region have been selected (Step S137; Yes), the detection unit 174 detects that the surface of the person's face is not skin (Step S138) and the living body determination process ends.

Returning to FIG. 5, when the living body determination process (Step S13) ends, the detection unit 174 detects whether or not it was determined in the living body determination process that the surface of the face is skin (Step S14). If the surface of the face is skin (Step S14; Yes), the living body determination process ends.

On the other hand, if the surface of the face is not skin (Step S14; No), the notification unit 175 controls the speaker 13 and the display 14 to give notice accordingly (Step S15). As a result, the officer can notice the disguise of the person trying to pass through the entry gate, and it is possible to prevent illegal entry. With this, the living body detection process ends.

As described above, the living body detection device 1 according to Exemplary embodiment 1 acquires (captures) images of a person irradiated by multiple different wavelength ranges, and when the luminances of the face region between the acquired images satisfy the relation exhibited by skin, judges that the surface of the person's face is skin. As a result, utilizing the differences in the spectra of luminances of reflected light between human skin and something other than human skin (for example, silicone resin), it is possible to detect with high accuracy whether or not the surface of a person's face is skin.

Moreover, the living body detection device 1 according to Exemplary embodiment 1 detects characteristic regions where the exposed surface of skin is comparative large (forehead region, right cheek region, and left cheek region) from the face region in the acquired images, and detects whether the surface of the person's face is skin using the luminances of the characteristic regions. For that reason, since the living body determination process does not need to be executed on the entire face region, the living body detection processing load is reduced.

Moreover, the living body detection device 1 according to Exemplary embodiment 1 judges whether or not the surface of a face is skin or not using not only the luminance of one pixel but also the luminances of pixels surrounding that pixel. Therefore, it is possible to detect with higher accuracy whether the surface of a face is skin.

Moreover, since the living body detection device 1 according to Exemplary embodiment 1 detects whether or not the surface of a face is skin using only infrared images A to C, it is possible to detect whether or not the surface of a face is skin with a comparatively small load.

Moreover, since the illumination unit 11 that the living body detection device 1 according to Exemplary embodiment 1 includes uses LED light sources, it is possible to emit infrared rays of a sufficient quantity having a peak at the center wavelength of the respective wavelength range. Therefore, detection of whether or not the surface of a face is skin with high accuracy becomes possible. Also, since the emission of far-infrared light is inhibited, there is less of a tendency to cause the transmission of radiant heat to the subject. For that reason, it is possible to prevent a person trying to pass disguised through the entry gate from sensing the existence of the living body detection device 1 from radiant heat.

Also, it is possible to use an infrared camera that captures images in the infrared region (1000 nm to 1700 nm) as the imaging unit 12 that the living body detection device 1 according to Exemplary embodiment 1 includes. For this reason, it is possible to use a camera that is constituted from a set of lenses 121, a shutter 122, and a CMOS image sensor 123, and it is possible to omit a spectral mirror and CMOS image sensors and filters for each wavelength range. Accordingly, it is possible to reduce the size of the imaging unit 12, and also possible to keep down the costs of the imaging unit 12.

In addition, in the living body detection device 1 according to Exemplary embodiment 1, the imaging unit 12 captures the infrared images A to C for each wavelength range emitted by the illumination unit 11. For this reason, it is possible to obtain the infrared images A to C in the time it takes to capture three infrared images. Accordingly, it is possible to obtain the infrared images A to C in a short time. Specifically, assuming the image capture time for one image is approximately 0.15 sec., it is possible to obtain the infrared images A to C within approximately 0.5 sec.

On the other hand, it is possible to capture infrared images similar to the infrared images A to C by emitting light in the infrared wavelength region from a halogen lamp or the like at a subject and using a hyper-spectrum camera or the like to capture images. However, in order to capture infrared images with a hyper-spectrum camera, since the image capture time is long, there is the risk of a drop in the inspection efficiency at the entry gate. Also, since a hyper-spectrum camera requires a spectral mirror and CMOS image sensors and filters for each wavelength range, it is costly, and miniaturization of the camera size is difficult. In addition, since a halogen lamp is used for the light source, due to the radiant heat emitted from the halogen light, there is a risk that a person trying to pass disguised through the entry gate may sense the existence of the living body detection device from the radiant heat.

Exemplary Embodiment 2

Subsequently, a living body detection device 2 according to Exemplary embodiment 2 will be described. Here, as shown in FIG. 3, the living body detection device 2 is substantially the same in configuration of components as the living body detection device 1 according to Exemplary embodiment 1 and differs only in the content of the living body determination process.

Figure 8:
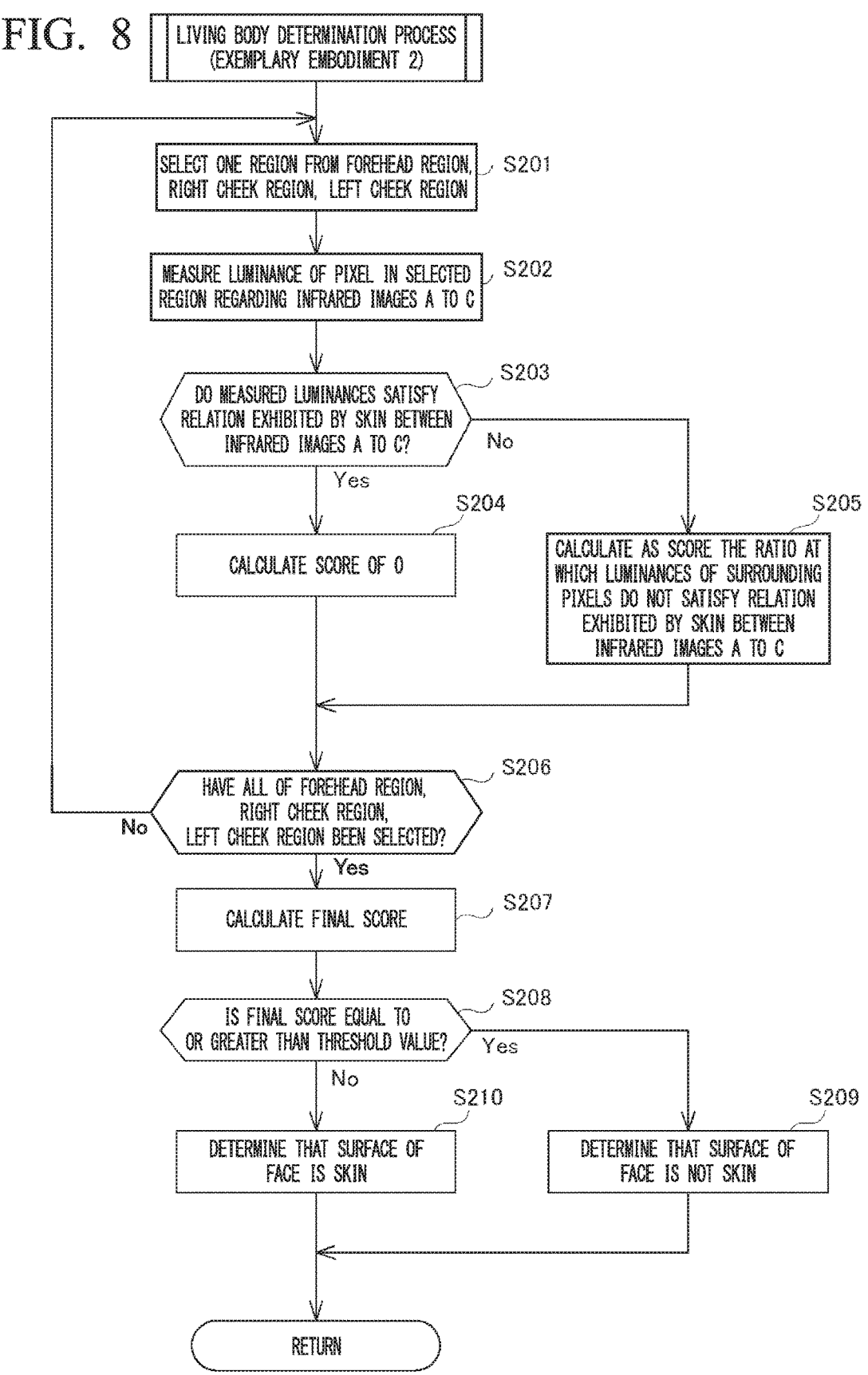
FIG. 8 is a flowchart that shows an example of the flow of the living body determination process of Exemplary embodiment 2.

The living body determination process executed by the living body detection device 2 will be described using the flowchart of FIG. 8. Here, as for the steps of which the contents are substantially the same as in the living body determination process shown in FIG. 7, their explanation will be simplified as appropriate. Moreover, the timing of starting the living body determination process in FIG. 8 is the same as in FIG. 7.

When the living body determination process is started, first, the determination unit 173 selects an unselected region from among the detected forehead region, right cheek region, and left cheek region (Step S201), selects one pixel in the selected region and measures the luminance of the pixel in each of the infrared images A to C (Step S202), and judges whether the measured luminances satisfy the relation exhibited by skin between the infrared images A to C (Step S203).

If it is judged that the luminances satisfy the relation exhibited by skin between the infrared images A to C (Step S203; Yes), the determination unit 173 calculates a living body determination score of the selected region to be 0 (Step S204) and the processing advances to Step S206.

On the other hand, if it is judged that the luminances do not satisfy the relation exhibited by skin between the infrared images A to C (Step S203; No), the determination unit 173 measures, in each of the infrared images A to C, the luminance of each of the pixels surrounding the pixel measured in Step S202 (for example, eight pixels neighboring the measured pixel). Then, the determination unit 173 calculates the ratio at which the luminances of the surrounding pixels do not satisfy the relation exhibited by skin between the infrared images A to C as a score of the selected region (Step S205), and the processing advances to Step S206. For example, if the luminances of all eight surrounding pixels do not satisfy the relation exhibited by skin between the infrared images A to C, the score is calculated to be 1 (8/8). On the other hand, if the luminances of two of the eight surrounding pixels do not satisfy the relation exhibited by skin between the infrared images A to C, the score is calculated to be 0.25 (2/8).

In Step S206, the determination unit 173 judges whether all of the forehead region, right cheek region, and left cheek region have been selected. If not all of the forehead region, right cheek region, and left cheek region have been selected (Step S206; No), the processing returns to Step S201.

If all of the forehead region, right cheek region, and left cheek region have been selected (Step S206; Yes), the determination unit 173 calculates the average of the scores calculated for the regions as the final score (Step S207). Then, the determination unit 173 judges whether the final score is equal to or greater than a predetermined threshold value (for example, 0.5) (Step S208).

If the final score is equal to or greater than the threshold value (Step S208; Yes), the detection unit 174 detects that the surface of the person's face is not skin (Step S209). On the other hand, if the final score is less than the threshold value (Step S208; No), the determination unit determines that the surface of the person's face is skin (Step S210). With this, the living body determination process ends.

As described above, in the living body determination process of Exemplary embodiment 2, a living body determination score is calculated for each of the right cheek region, left cheek region, and forehead region whereby it is determined whether or not the surface of the face is skin. Therefore, it is possible to detect whether the surface of a face is skin with higher accuracy than the living body determination process of Exemplary embodiment 1, in which it is immediately determined that the surface of a face is not skin when the luminances of any one of the regions (cheek region, right cheek region, and left cheek region) do not satisfy the relation exhibited by a living body.

Exemplary Embodiment 3

Subsequently, a living body detection device 3 according to Exemplary embodiment 3 will be described. Here, as shown in FIG. 2, the living body detection device 3 is substantially the same in configuration of components as the living body detection devices 1 and 2 according to Exemplary embodiments 1 and 2 and differs only in the content of the living body determination process.

Figure 9:
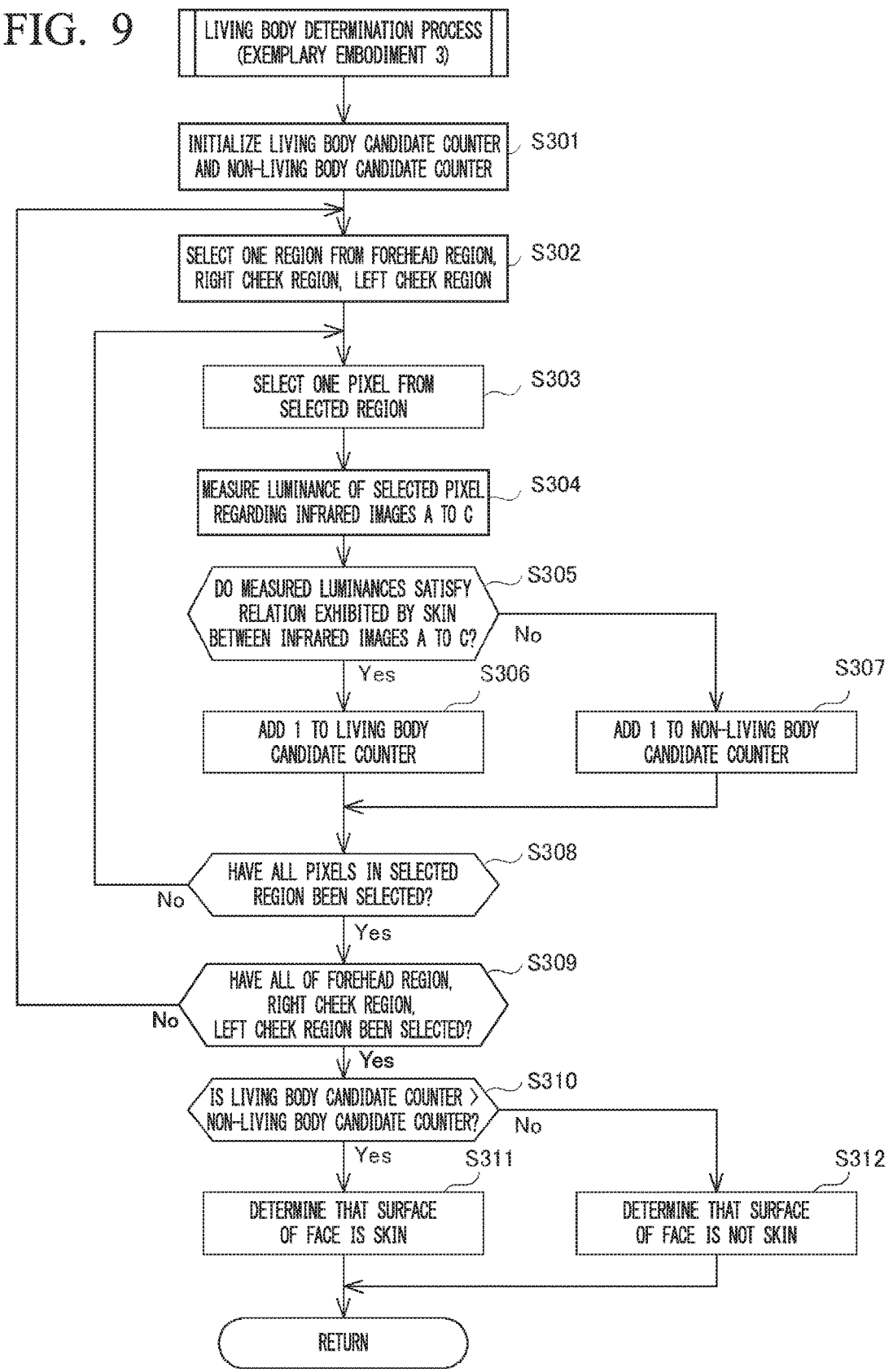
FIG. 9 is a flowchart that shows an example of the flow of the living body determination process of Exemplary embodiment 3.

The living body determination process executed by the living body detection device 3 will be described using the flowchart of FIG. 9. Here, as for the steps of which the contents are substantially the same as in the living body determination process shown in FIG. 7, their explanation will be simplified as appropriate. Moreover, the timing of starting the living body determination process in FIG. 9 is the same as in FIG. 7.

When the living body determination process is started, first, the determination unit 173 initializes a living body candidate counter and a non-living body candidate counter used in living body determination to zero (Step S301).

Subsequently, the determination unit 173 selects one of the forehead region, right cheek region, and left cheek region (Step S302). Then, the determination unit 173 selects one of the unselected pixels in the selected region (Step S303). The pixel selected in Step S303 is also referred to as the selected pixel hereafter.

Subsequently, the determination unit 173 measures the luminance of the selected pixel in each of the infrared images A to C (Step S304). Then, the determination unit 173 judges whether the measured luminances satisfy the relation exhibited by skin between the infrared images A to C (Step S305).

If the measured luminances satisfy the relation exhibited by skin (Step S305; Yes), the determination unit 173 adds 1 to the living body candidate counter (Step S306). On the other hand, if the measured luminances do not satisfy the relation exhibited by skin (Step S305; No), the determination unit 173 adds 1 to the non-living body candidate counter (Step S307).

Subsequently, the determination unit 173 determines whether all pixels in the selected region have been selected (Step S308).

If not all pixels have been selected (Step S308; No), the processing returns to Step S303 and the determination unit 173 selects one pixel from the selected region and repeats the process to add 1 to the living body candidate counter or to the non-living body candidate counter based on the luminance of the pixel.

On the other hand, if all pixels have been selected (Step S308; Yes), the determination unit 173 judges whether all of the forehead region, right cheek region, and left cheek region have been selected (Step S309). If not all of the forehead region, right cheek region, and left cheek region have been selected (Step S309; No), the processing returns to Step S302.

If all of the forehead region, right cheek region, and left cheek region have been selected (Step S309; Yes), in other words after the living body candidate counter or non-living body candidate counter is incremented for each of all pixels in the forehead region, right cheek region, and left cheek region, the determination unit 173 judges whether the living body candidate counter has a higher value than the non-living body candidate counter (Step S310).

If the living body candidate counter has a higher value than the non-living body candidate counter (Step S310; Yes), the detection unit 174 detects that the surface of the face is skin (Step S311).

On the other hand, if the living body candidate counter does not have a higher value than the non-living body candidate counter (Step S310; No), the detection unit 174 detects that the surface of the face is not skin (Step S312). With this, the living body determination process ends.

As described above, in the living body determination process of Exemplary embodiment 3, the luminances of all pixels in the forehead region, right cheek region, and left check region are used to determine whether the surface of a face is skin, whereby it is possible to detect whether it is a living body with better accuracy.

In the living body detection process of FIG. 9, only the living body candidate counter may be used to perform living body detection based on whether the value of the living body candidate counter has a value equal to or higher than a predetermined value in Step S310. For example, with the predetermined value set to a pixel number value of 80% of all pixels in the forehead region, right cheek region, and left cheek region, it is possible to judge that the surface of a face is skin when 80% or more of all the pixels are counted as a living body candidate.

Moreover, in the living body detection process of FIG. 9, 1 is added to the living body counter in Step S306 when the luminance of the selected pixel satisfies the relation exhibited by skin (Step S305; Yes). However, when the luminance of the selected pixel satisfies the relation exhibited by skin, it may be determined as in Exemplary embodiment 1 whether the surrounding pixels satisfy the relation exhibited by skin, and only in the case of satisfying the relation, 1 is added to the living body candidate counter.

Exemplary Embodiment 4

Subsequently, a living body detection device 4 according to Exemplary embodiment 4 will be described. Here, as shown in FIG. 2, the living body detection device 4 is substantially the same in configuration of components as the living body detection device 1 according to Exemplary embodiment 1 and differs only in the content of the living body detection process and living body determination process.

The living body determination process executed by the living body detection device 4 will be described using the flowchart of FIG. 10. It should be noted that with regard to the steps of which the contents are substantially the same as in the living body determination process shown in FIG. 5, their explanation will be simplified as appropriate.

Figure 10:
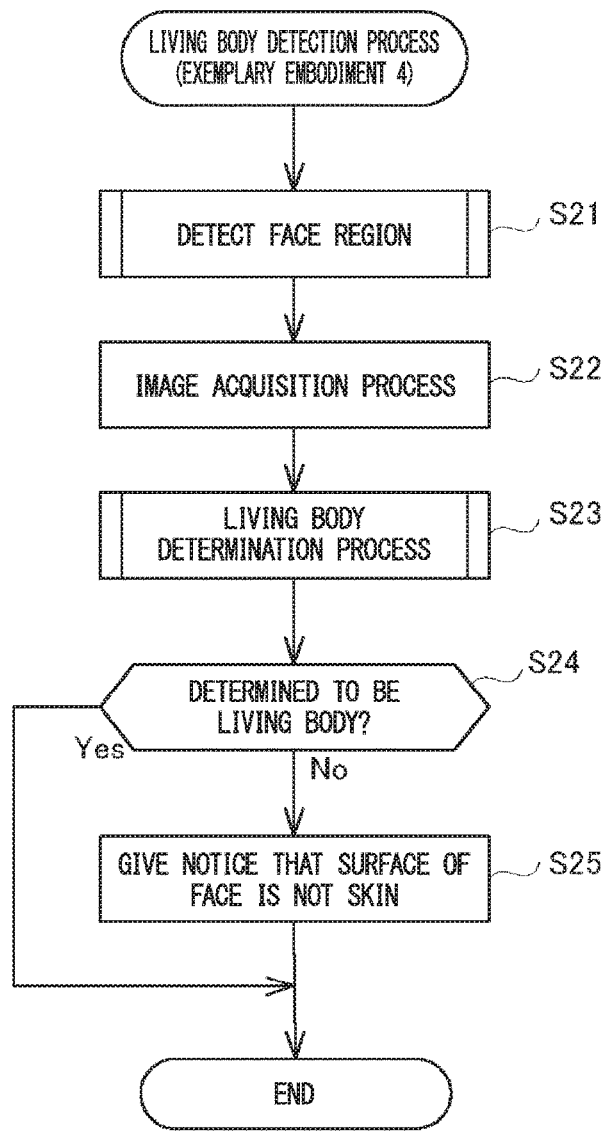
FIG. 10 is a flowchart that shows an example of the flow of the living body detection process of Exemplary embodiment 4.

In the living body detection process of FIG. 10, first, the imaging control unit 170 turns on the light sources 111 (111A to 111C) of the illumination unit 11 and controls the imaging unit 12. The image acquisition unit 171 acquires images of the person in each wavelength range (infrared images A to C) (Step S21).

Figure 6:
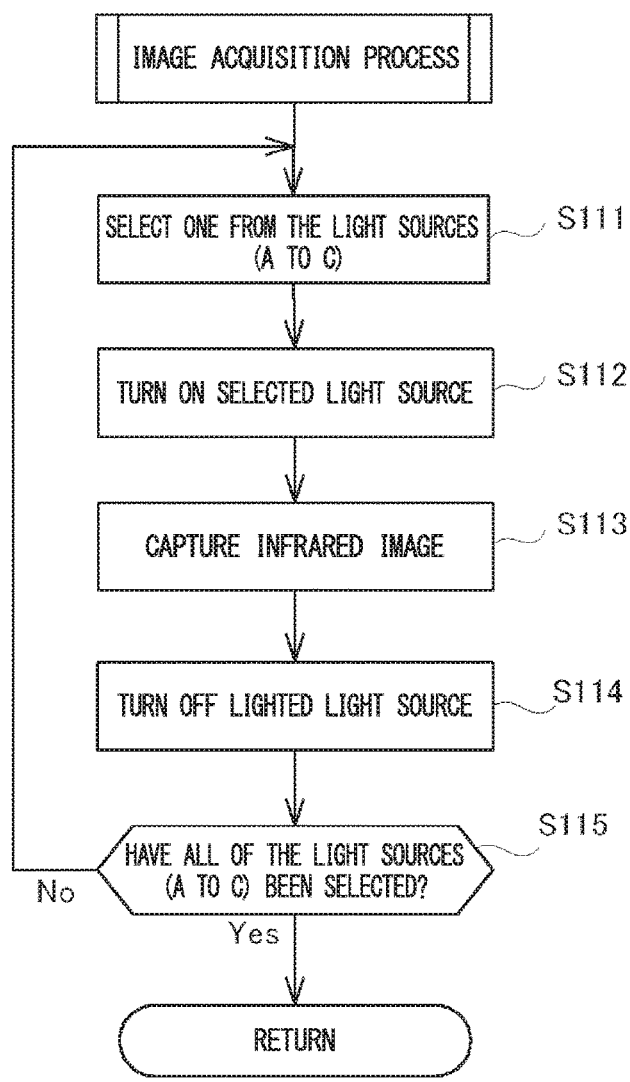
FIG. 6 is a flowchart that shows an example of the image acquisition process of the living body detection process.

Here, the details of the image acquisition process are the same as those described referring to the flowchart of FIG. 6 in Exemplary embodiment 1.

As a result of the imaging control unit 170 performing Step S21, the infrared image A of the subject irradiated by light in the wavelength range around 1180 nm, the infrared image B of the subject irradiated by light in the wavelength range around 1280 nm, and the infrared image C of the subject irradiated by light in the wavelength range around 1500 nm are obtained.

Subsequently the face detection unit 172 detects a face region from the acquired infrared images A to C (Step S22).

Figure 11A:
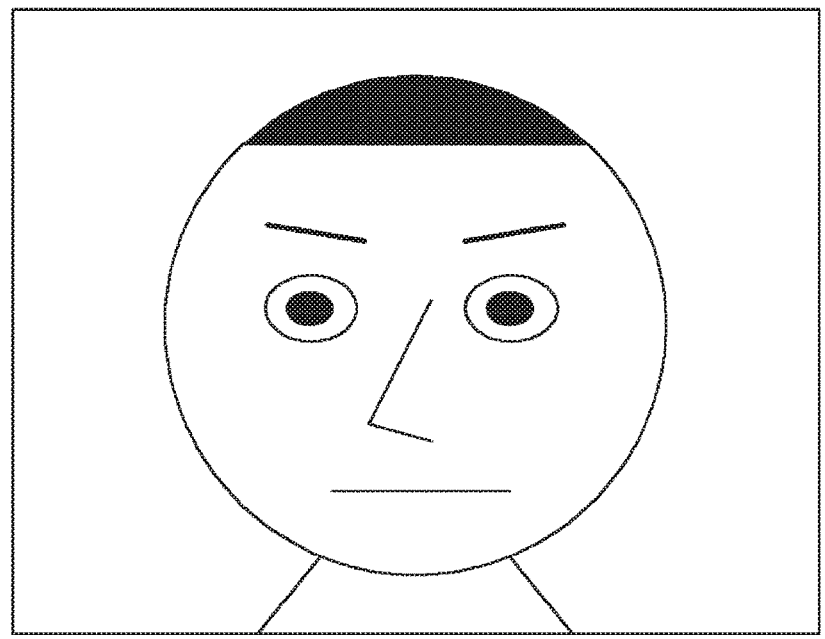
FIG. 11A is a diagram that shows an example of an infrared image.
Figure 11B:
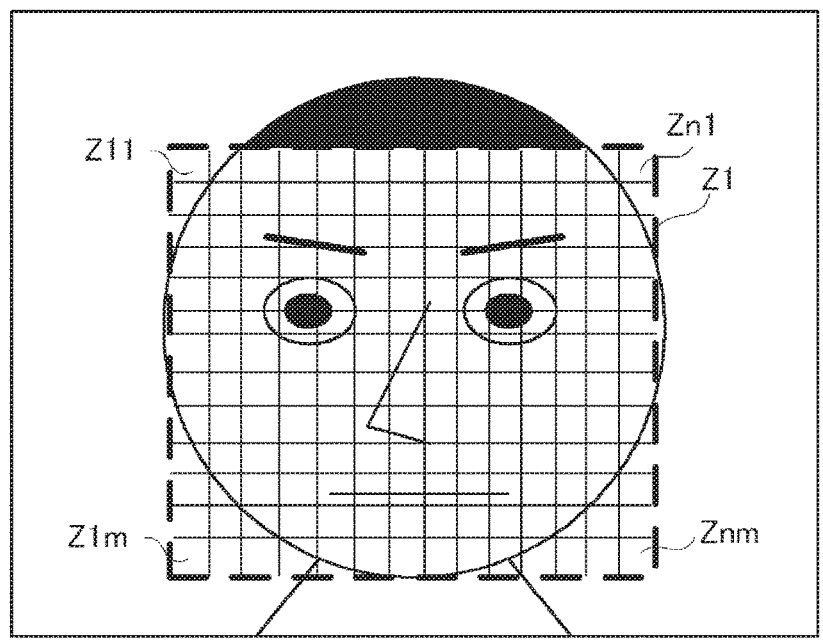
FIG. 11B is a diagram that shows each region in the infrared image shown in FIG. 11A.

Here, the processing by the face detection unit 172 will be described using a specific example. For example, the case will be assumed of the infrared images A to C as shown in FIG. 11A being provided as the processing target of the face detection unit 172. In such a case, the face detection unit 172 detects a region Z1 including the face as shown in FIG. 11B.

Subsequently, the determination unit 173 compares the luminances of the face region between the infrared images A to C acquired in Step S21 so as to execute the living body determination process to determine whether or not the surface of the person's face is skin (Step S23).

Figure 12:
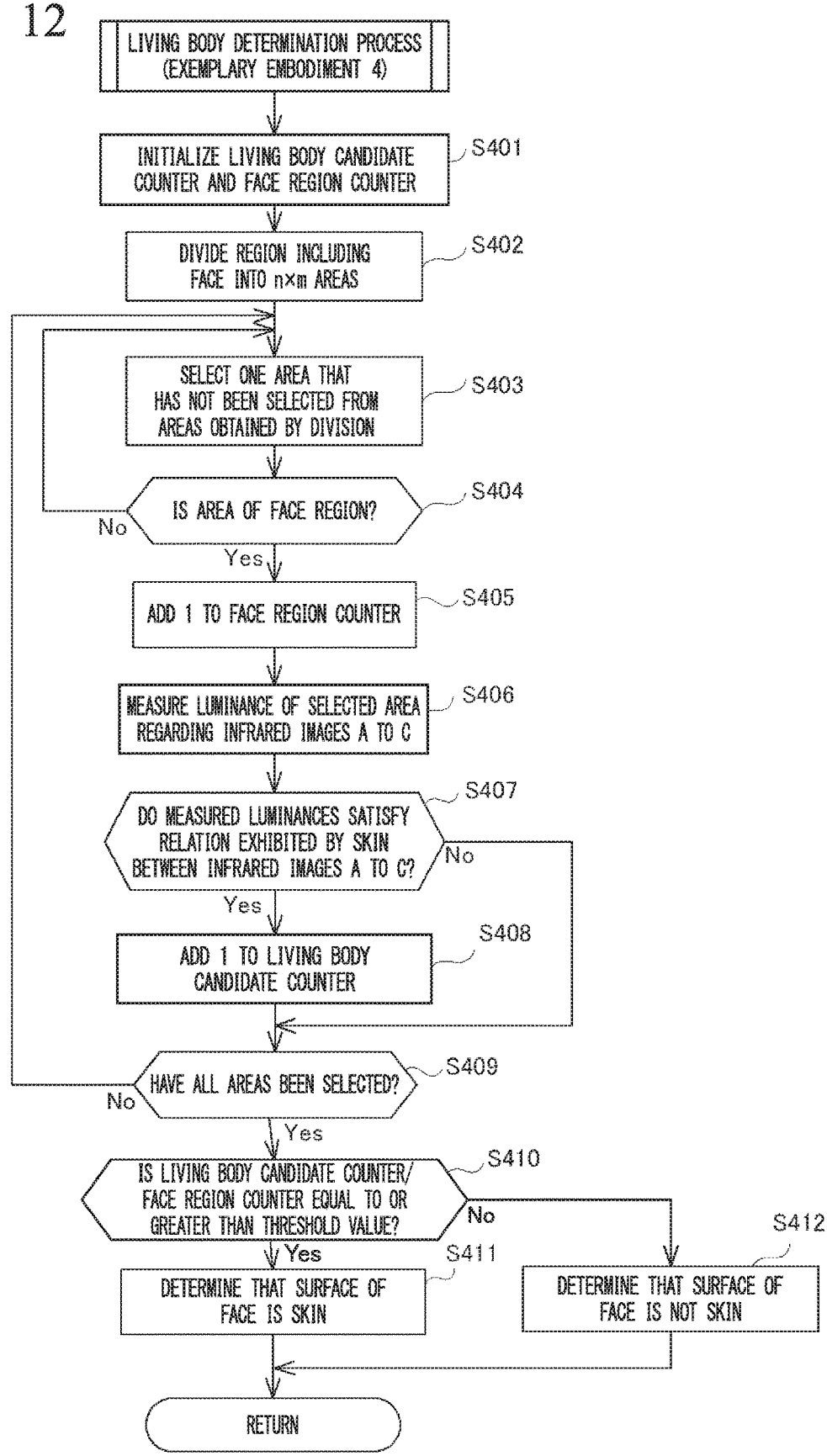
FIG. 12 is a flowchart that shows an example of the flow of the living body determination process of Exemplary embodiment 4.

Subsequently, the living body determination process will be described using the flowchart of FIG. 12. Here, as for the steps of which the contents are substantially the same as in the living body determination process shown in FIG. 7, their explanation will be simplified as appropriate.

When the living body determination process is started, first, the determination unit 173 initializes a living body candidate counter and a face region counter (Step S401). Next, as shown in FIG. 11B, the region Z1 including the face is divided into a matrix of n×m areas (Z11 to Znm) (Step S402). "n" and "m" are arbitrary values, and for example, n=256 and m=256. Next, an unselected area is selected from the areas (Z11 to Znm) obtained by the division (Step S403). Next, the determination unit 173 determines whether this selected area is of the face region (Step S404). This determination is performed by specifying a face outline by a publicly known method, and determining whether the selected area is on the inside of the face outline. In the case of the selected area being inside the face outline, it is specified as being of the face region. In the case of the selected area not being inside the face outline, it is specified as not being of the face region.

Next, in the case of the selected area not being of the face region (Step S404; No), the processing returns to Step S403.

In the case of the selected area being of the face region (Step S404; Yes), 1 is added to the face region counter (Step S405).

Next, the luminance of the selected area is measured in each of the infrared images A to C (Step S406), and it is judged whether the measured luminance satisfies the relation exhibited by skin between the infrared images A to C (Step S407).

Here, more specifically, the determination unit 173 in Step S407 judges whether or not the following relational expression (4) is satisfied. Here, in the relational expression (4), IA is the luminance measured in the infrared image A, IB is the luminance measured in the infrared image B, and IC is the luminance measured in the infrared image C. Also, $\alpha$, $\beta$, $\gamma$, and Y are coefficients and preset to numerical values optimum for the living body detection based on image capturing conditions.

$$Y \leq \alpha \times IA + \beta \times IB + \gamma \times IC \quad (4)$$

If the luminance is judged as satisfying the relation exhibited by skin between the infrared images A to C (Step S407; Yes), the determination unit 173 adds 1 to the living body candidate counter for the selected region (Step S408).

On the other hand, if the luminance is judged as not satisfying the relation exhibited by skin between the infrared images A to C (Step S407; No), the processing advances to Step S409.

Next, the determination unit 173 determines whether all the areas obtained by the division in Step S402 have been selected (Step S409). If not all of the areas obtained by the division have been selected (Step S409; No), the processing returns to Step S403.

If all of the areas obtained by the division in Step S402 have been selected (Step S409; Yes), the determination unit 173 determines whether a value PA that is obtained by dividing the value of the living body candidate counter by the face region counter is equal to or greater than a threshold value (Step S410). It should be noted that this threshold value is not particularly limited provided it is a value equal to or less than 1, for example, 0.8.

If the value PA is equal to or greater than the threshold value (Step S410; Yes), the detection unit 174 determines that the surface of the person's face is skin (Step S411). On the other hand, if the value PA is less than the threshold value (Step S410; No), the determination unit determines that the surface of the person's face is not skin (Step S412). With this, the living body determination process ends.

As described above, in the living body determination process of Exemplary embodiment 4, the face region is divided into a matrix of areas and it is determined whether or not each of the areas obtained by the division exhibits a relation satisfied by skin. Depending on whether the ratio of areas determined to be a living body of the entire face region is equal to or greater than the threshold value, a determination is made as to whether the surface of the face is skin. Therefore, it is possible to detect whether the surface of a face is skin with higher accuracy than the living body determination process of Exemplary embodiment 1, in which it is immediately determined that the surface of a face is not skin when the luminances of any one of the regions (cheek region, right cheek region, and left cheek region) do not satisfy the relation exhibited by a living body.

Modified Examples

The present disclosure is not confined to the above exemplary embodiments and various changes can be made to the extent of not departing from the scope of the present invention.

The living body detection devices 1 to 4 shown in FIG. 2 are described on the assumption that the illumination unit 11, imaging unit 12, and the like are all integrated, however needless to say they may be separated as appropriate. For example, the illumination unit 11, the imaging unit 12, the speaker 13, and the like may be separately prepared and combined with a device having the function of the control unit 17 (for example, a PC or the like) to configure the living body detection devices 1 to 4. Alternatively, the living body detecting device 1 may be configured by having the function of the control unit 17 built into the camera 12, with the control unit of the camera 12 working together with the illumination unit 11, speaker 13, and the like as appropriate.

Also, in the above-described exemplary embodiments, the infrared images A to C are captured by synchronizing the illumination unit 11 and the imaging unit 12. However, without synchronizing the illumination unit 11 and the imaging unit 12, the illumination unit 11 may emit infrared light in a given wavelength range at the subject, and the infrared images that have been captured by the imaging unit 12 may then be sorted in terms of infrared light of what wavelength range was emitted at the subject. Specifically, an infrared image is captured with an indicator, whose reflectance differs for each wavelength range, being placed in a location appeared at the peripheral part of the infrared image (for example, a wall behind the subject). Infrared light of a given wavelength range is emitted from the illumination unit 11 at the subject and the indicator, and the imaging unit 12 captures an infrared image of the subject. The control unit 17 sorts the infrared images according to the wavelength range of the emitted infrared light from the luminance of the indicator appeared at the peripheral part of the captured infrared image.

Also, in the above-described exemplary embodiments, it is determined that the surface of a face is skin when the luminances of an image of a subject irradiated by light in a wavelength range around 1180 nm (infrared image A), an image of a subject irradiated by light in a wavelength range around 1280 nm (infrared image B), and an image of a subject irradiated by light in a wavelength range around 1500 nm (infrared image C) satisfy the relation exhibited by skin. However, images in other wavelength ranges may be used to determine whether the surface of a face is skin.

Also, in the above-described exemplary embodiments, the luminances of images in three wavelength ranges (infrared images A to C) are used to determine whether the surface of a face is skin. However, whether the surface of a face is skin may be determined from images of two wavelength ranges, and whether the surface of a face is skin may be determined from images of four or more wavelength ranges.

Also, in the above-described exemplary embodiments, the face detection unit 172 detects a forehead region, a right cheek region, and a left cheek region from the face region, and the determination unit 173 compares the luminances of the regions between the images to determine whether the surface of the face is skin. However, the face detection unit 172 does not need to detect all of a forehead region, right cheek region, and left cheek region, and has only to detect at least one region. For example, the face detection unit 172 may detect only a forehead region, and the determination unit 173 may compare only the luminances of the forehead region to determine whether the surface of the face is skin. Moreover, the face detection unit 172 may detect a characteristic region other than the forehead region, right cheek region, and left cheek region, with the luminance of that region being used to determine whether the surface of the face is skin. Moreover, the face detection unit 172 may detect only a face region, and the determination unit 173 may compare the luminances of the entire face region or a part thereof to determine whether the surface of the face is skin.

Moreover, when the position of the imaging unit 12 and the point of photographing a person are fixed so that the face of the person definitely appears in a specific area of the image, the determination unit 173 may compare the luminances of that specific area to determine whether the surface of the face is skin. In such a case, the living body detection devices 1 to 4 do not need to be provided with the face detection unit 172.

Also, in the above-described exemplary embodiments, a description is given for the case of detecting whether or not the surface of a face is skin, however, detection of whether it is skin may be performed together with detection of whether it is a fake living body such as silicone resin or the like. In this case, for example, relational expressions for performing detection of a fake living body are found in advance. Then, together with determining whether or not the luminances of the selected pixels in the infrared images A to C satisfy the relation exhibited by skin in the living body determination process, by determining whether or not it is a fake living body from the relational expressions found above, it is possible to detect whether the pixels are of skin or of a fake living body. For that reason, it is possible to determine with greater accuracy whether the surface of a face is skin or a disguising mask of a fake living body.

Also, in the living body detection devices 1 to 4 of the above-described exemplary embodiments, the light source uses infrared LEDs in the 1180 nm, 1280 nm, and 1500 nm wavelength ranges, but these infrared LEDs may be changed to infrared LEDs in the 1200 nm, 1300 nm, 1450 (1550) nm wavelength ranges that are easy to obtain. Also, provided it is capable of emitting light of the desired wavelength range, the light source is not particularly limited, and a light source other than an LED may be used. For example, illumination in each wavelength range may be obtained by combining a halogen light source and a plurality of cut filters (for example, combining a cut filter that cuts light equal to or less than 1130 nm and a cut filter that cuts light equal to or greater than 1230 nm to obtain an image in a wavelength range of 1180±50 nm).

Moreover, the above-described exemplary embodiments are described using the example of installing the living body determination devices 1 to 4 in an immigration inspection area. However, the place where the living body determination devices 1 to 4 are installed is not restricted thereto. Essentially, when it is necessary to perform detection of whether or not the surface of a face is skin, by installing the living body determination devices 1 to 4, it is possible to perform detection of whether the surface of a face is skin. For example, the living body determination devices 1 to 4 may also be installed for use near the departure gate of an embarkation inspection area, needless to say, or at an entrance to a company or large-scale leisure facility.

Moreover, in the above-described exemplary embodiments, the living body determination devices 1 to 4 detect whether the surface of a face is skin as opposed to a disguising mask made of silicone resin. However, the present invention may be used for detecting whether the surface of a face is skin as opposed to the case of the skin being covered by a disguising mask made of some other material.

For example, a resin mask exhibits high luminance in a wavelength range of 1480 to 1580 nm while human skin exhibits low luminance in this wavelength range. Moreover, a synthetic rubber mask exhibits extremely low luminance in a wavelength range of 1480 to 1580 nm compared to human skin. Therefore, taking into account such differences between skin and other materials, it is possible to detect with greater accuracy whether the surface of a face is skin as opposed to a mask made of resin or synthetic rubber.

Moreover, it is possible to apply an operation program defining the operation of the living body determination devices 1 to 4 according to the above-described exemplary embodiments to an existing personal computer, information terminal device, or the like to allow the personal computer or the like to function as the living body determination devices 1 to 4 according to the present invention.

Moreover, such a program may be distributed by any method, for example, the program may be saved and distributed on a computer-readable recording medium such as a compact disk read-only memory (CD-ROM), digital versatile disk (DVD), magneto-optical disk (MO), and memory card, or may be distributed via a communication network such as the Internet.

Various exemplary embodiments and modifications of the present invention are possible without departing from the broader spirit and scope of the present invention. Accordingly, the exemplary embodiments described above are illustrative of this invention and do not restrict the scope of the present invention. That is, the scope of the present invention is indicated by the claims and not the exemplary embodiments. The claims and various modifications within the scope of the meaning of the invention equivalent to that are within the scope of this invention.

The above-described exemplary embodiments are entirely or partly, but not exclusively, described as in the following Supplementary Notes.

Supplementary Note 1

A living body detection device including:
an image acquisition unit that acquires a first image in which a subject irradiated by light in a first wavelength range is imaged, and a second image in which the subject irradiated by light in a second wavelength range is imaged, the second wavelength range being different from the first wavelength range:
a determination unit that determines whether a relation expressed by luminance of the subject imaged in the first image and luminance of the subject imaged in the second image is a relation exhibited by a living body; and
a detection unit that detects that the subject is a living body in a case where the determination unit has determined that it is the relation exhibited by the living body.

Supplementary Note 2

The living body detection device according to Supplementary Note 1, including:
an illumination unit that emits light in the first wavelength range and light in the second wavelength range at the subject;
an imaging unit that captures the first image and the second image;
an imaging control unit that synchronizes emission of the light in the first wavelength range by the illumination unit and capture of the first image by the imaging unit, and synchronizes emission of the light in the second wavelength range by the illumination unit and capture of the second image by the imaging unit.

Supplementary Note 3

The living body detection device according to Supplementary Note 2,
wherein the illumination unit includes a light source of an infrared LED emitting the light in the first wavelength range and a light source of an infrared LED emitting the light in the second wavelength range, and
the imaging unit is constituted by one infrared camera that captures the first image and the second image.

Supplementary Note 4

The living body detection device according to any one of Supplementary Notes 1 to 3,
wherein the light in the first wavelength range is light in a wavelength range such that luminance of a living body in an image irradiated by the light is equivalent to luminance of a fake living body in an image irradiated by the light; and
the light in the second wavelength range is light in a wavelength range such that luminance of a living body in an image irradiated by the light differs by at least 20 percent with luminance of a fake living body in an image irradiated by the light.

Supplementary Note 5

The living body detection device according to any one of Supplementary Notes 1 to 4,
wherein the image acquisition unit further acquires a third image in which the subject irradiated by light in a third wavelength range is imaged, the third wavelength range being different from the first wavelength range and the second wavelength range, and
the determination unit determines whether a relation exhibited by luminance of the subject imaged in the first image, luminance of the subject imaged in the second image and luminance of the subject imaged in the third image is a relation exhibited by a living body.

Supplementary Note 6

The living body detection device according to Supplementary Note 5,
wherein the first wavelength range is around 1180 nm, the second wavelength range is around 1280 nm, and the third wavelength range is around 1500 nm, and
the determination unit determines it is the relation exhibited by the living body, in the case of a relation in which luminance of the subject imaged in the second image is greater by a predetermined ratio than luminance of the subject imaged in the first image and luminance of the subject imaged in the third image.

Supplementary Note 7

The living body detection device according to Supplementary Note 6, including:
a face detection unit that detects a face region of a person from each image acquired by the image acquisition unit,
wherein the determination unit determines it is the relation exhibited by the living body, in a case of a relation in which luminance of the face region imaged in the second image is greater by a predetermined ratio than luminance of the face region imaged in the first image and luminance of the face region imaged in the third image.

Supplementary Note 8

The living body detection device according to Supplementary Note 7,
wherein the face detection unit detects a characteristic region from the face region, and
the determination unit determines it is the relation exhibited by the living body, in a case of a relation in which luminance of the characteristic region imaged in the second image is greater by a predetermined ratio than luminance of the characteristic region imaged in the first image and luminance of the characteristic region imaged in the third image.

Supplementary Note 9

The living body detection device according to any one of Supplementary Notes 1 to 8, further including:
a notification unit that gives notice that the subject is not a living body in a case where the detection unit has detected that the subject is not a living body.

Supplementary Note 10

The living body detection device according to any one of Supplementary Notes 1 to 9, wherein the living body is skin.

Supplementary Note 11

The living body detection device according to Supplementary Note 4, wherein the fake living body is constituted with silicone resin.

Supplementary Note 12

A living body detection method including:
an image acquisition step of acquiring a first image in which a subject irradiated by light in a first wavelength range is imaged, and a second image in which the subject irradiated by light in a second wavelength range is imaged, the second wavelength range being different from the first wavelength range:
a determination step of determining whether a relation expressed by luminance of the subject imaged in the first image and luminance of the subject imaged in the second image is a relation exhibited by a living body; and
a detection step of detecting that the subject is a living body in a case where the determination unit has determined that it is the relation exhibited by the living body.

Supplementary Note 13

A recording medium that stores a program that causes a computer to function as:
an image acquisition unit that acquires a first image in which a subject irradiated by light in a first wavelength range is imaged, and a second image in which the subject irradiated by light in a second wavelength range is imaged, the second wavelength range being different from the first wavelength range;
a determination unit that determines whether a relation expressed by luminance of the subject imaged in the first image and luminance of the subject imaged in the second image is a relation exhibited by a living body; and
a detection unit that detects that the subject is a living body in a case where the determination unit has determined that it is the relation exhibited by the living body.

INDUSTRIAL APPLICABILITY

The present invention may be preferably used for determining whether a person entering a country at an immigration inspection area is wearing a disguise.

DESCRIPTION OF THE REFERENCE SYMBOLS 1, 2, 3, 4: Living body detection device
11: Illumination unit
111 (111A to 111C): Light source
112 (112A to 112C): Relay
12: Imaging unit
121: Lens
122: Shutter
123: CMOS image sensor
13: Speaker
14: Display
15: Operating unit
16: External storage device
17: Control unit
170: Imaging control unit
171: Image acquisition unit
172: Face detection unit
173: Determination unit
174: Detection unit
175: Notification unit

The invention claimed is:

1. A living body detection device comprising:
a memory storing instructions; and
at least one processor configured to process the instructions to:
acquire a first captured image in which a subject irradiated by light in a first wavelength range is imaged, a second captured image in which the subject irradiated by light in a second wavelength range is imaged, and a third captured image in which the subject irradiated by light in a third wavelength range is imaged, the second wavelength range being different from the first wavelength range, the third wavelength range being different from the first wavelength and the second wavelength; and
determine whether the subject is a living body on the basis of a relation expressed by luminance of the subject imaged in the first image, luminance of the subject imaged in the second image, and luminance of the subject imaged in the third image is a relation exhibited by a living body, wherein
the first wavelength range is around 1180 nm or around 1200 nm, the second wavelength range is around 1280 nm or around 1300 nm, and the third wavelength range is around 1450 nm or around 1500 nm, and
the at least one processor determines that the subject is a living body, in a case that (i) luminance of the subject imaged in the third wavelength range is lower by a predetermined ratio than luminance of the subject imaged in the first wavelength range, and that (ii) luminance of the subject imaged in the third image is lower by a predetermined ratio than luminance of the subject imaged in the second wavelength range.

2. The living body detection device according to claim 1, wherein the at least one processor is further configured to:
detect a face region of a person from each acquired image,
wherein the at least one processor determines the subject is a living body, in a case of a relation in which (i) luminance of the face region imaged in the third image is lower by a predetermined ratio than luminance of the face region imaged in the first image and (ii) luminance of the face region imaged in the first image is lower by a predetermined ratio than luminance of the face region imaged in the second image.

3. The living body detection device according to claim 2, wherein the at least one processor:
detects a characteristic region from the face region, and
determines it is the relation exhibited by the living body, in a case of a relation in which (i) luminance of the characteristic region imaged in the third image is lower by a predetermined ratio than luminance of the characteristic region imaged in the first image and (ii) luminance of the characteristic region imaged in the first image is lower by a predetermined ratio than luminance of the characteristic region imaged in the second image.

4. The living body detection device according to claim 1, wherein the living body is human skin.

5. A living body detection method comprising:
a step of acquiring a first captured image in which a subject irradiated by light in a first wavelength range is imaged, a second captured image in which the subject irradiated by light in a second wavelength range is imaged, and a third captured image in which the subject irradiated by light in a third wavelength range is imaged, the second wavelength range being different from the first wavelength range, the third wavelength range being different from the first wavelength and the second wavelength; and
a step of determining whether the subject is a living body on the basis of a relation expressed by luminance of the subject imaged in the first image, luminance of the subject imaged in the second image, and luminance of the subject imaged in the third image is a relation exhibited by a living body, wherein
the first wavelength range is around 1180 nm or around 1200 nm, the second wavelength range is around 1280 nm or around 1300 nm, and the third wavelength range is around 1450 nm or around 1500 nm, and
the step of determining includes determining that the subject is a living body, in the case that (i) luminance of the subject imaged in the third wavelength range is lower by a predetermined ratio than luminance of the subject imaged in the first wavelength range, and that (ii) luminance of the subject imaged in the third wavelength range is lower by a predetermined ratio than luminance of the subject imaged in the second wavelength range.

6. The living body detection method according to claim 5, further comprising:
a step of detecting a face region of a person from each image acquired in the step of image acquiring,
wherein the step of determining includes determining the subject is a living body, in a case of a relation in which (i) luminance of the face region imaged in the third image is lower by a predetermined ratio than luminance of the face region imaged in the first image and (ii) luminance of the face region imaged in the first image is lower by a predetermined ratio than luminance of the face region imaged in the second image.

7. The living body detection method according to claim 6, wherein the step of face detecting includes detecting a characteristic region from the face region, and
the step of determining includes determining the subject is a living body, in a case of a relation in which (i) luminance of the characteristic region imaged in the third image is lower by a predetermined ratio than luminance of the characteristic region imaged in the first image and (ii) luminance of the characteristic region imaged in the first image is lower by a predetermined ratio than luminance of the characteristic region imaged in the second image.

8. The living body detection method according to claim 5, wherein the living body is human skin.

9. A non-transitory recording medium that stores a program that causes a computer to:

acquire a first captured image in which a subject irradiated by light in a first wavelength range is imaged, a second captured image in which the subject irradiated by light in a second wavelength range is imaged, and a third captured image in which the subject irradiated by light in a third wavelength range is imaged, the second wavelength range being different from the first wavelength range, the third wavelength range being different from the first wavelength and the second wavelength; and determine whether the subject is a living body on the basis of a relation expressed by luminance of the subject imaged in the first image, luminance of the subject imaged in the second image, and luminance of the subject imaged in the third image is a relation exhibited by a living body, wherein the first wavelength range is around 1180 nm or around 1200 nm, the second wavelength range is around 1280 nm or around 1300 nm, and the third wavelength range is around 1450 nm or around 1500 nm, and the at least one processor determines that the subject is a living body, in the case that (i) luminance of the subject imaged in the third wavelength range is lower by a predetermined ratio than luminance of the subject imaged in the first wavelength range, and that (ii) luminance of the subject imaged in the third wavelength range is lower by a predetermined ratio than luminance of the subject imaged in the second wavelength range.

10. The non-transitory recording medium according to claim 9, wherein the program stored in the non-transitory recording medium further causes the computer to:

detect a face region of a person from each acquired image, wherein the computer determines the subject is a living body, in a case of a relation in which (i) luminance of the face region imaged in the third image is lower by a predetermined ratio than luminance of the face region imaged in the first image and (ii) luminance of the face region imaged in the first image is lower by a predetermined ratio than luminance of the face region imaged in the second image.

11. The non-transitory recording medium according to claim 10, wherein the computer:

detects a characteristic region from the face region, and determines it is the relation exhibited by the living body, in a case of a relation in which (i) luminance of the characteristic region imaged in the third image is lower by a predetermined ratio than luminance of the characteristic region imaged in the first image and (ii) luminance of the characteristic region imaged in the first image is lower by a predetermined ratio than luminance of the characteristic region imaged in the second image.

12. The non-transitory recording medium according to claim 9, wherein the living body is human skin.

\* \* \* \* \*